June 21, 1949.  F. W. LYLE  2,473,893
OBJECT DETECTING AND INDICATING DEVICE
Filed Sept. 19, 1941  2 Sheets-Sheet 1

WITNESSES:
James F. Young

INVENTOR
Frederick W. Lyle.
BY
F. W. Lyle
ATTORNEY

June 21, 1949.   F. W. LYLE   2,473,893
OBJECT DETECTING AND INDICATING DEVICE
Filed Sept. 19, 1941   2 Sheets-Sheet 2

WITNESSES:
Robert C. Baird

INVENTOR
Frederick W. Lyle.
BY
F. W. Lyle
ATTORNEY

Patented June 21, 1949

2,473,893

UNITED STATES PATENT OFFICE 2,473,893

OBJECT DETECTING AND INDICATING DEVICE

Frederick W. Lyle, Irwin, Pa., assignor to Westinghouse Electric Corporation, East Pittsburgh, Pa., a corporation of Pennsylvania Application September 19, 1941, Serial No. 411,509

5 Claims. (Cl. 177—384)

My invention relates to object detecting devices and, in particular, to devices for determining, by means of devices sensitive to radiant energy, when a solid body traverses a particular limited volume of space distant from the abovementioned apparatus.

One object of my invention is to provide an apparatus which will automatically produce a signal when a particular limited volume of space is occupied by an object which it is desired to detect.

Another object of my invention is to provide an apparatus of the type mentioned in the immediately preceding paragraph in which all elements of the detecting apparatus are located at points on the same lateral side of the space-volume under observation.

Still another object of my invention is to provide an arrangement in which a gun will be discharged whenever an object moves into a certain limited volume of space located within the trajectory of the projectile fired by the gun.

A further object of my invention is to provide an apparatus which will produce a signal whenever a moving object, such as a baseball, passes through a limited volume of space, such as the volume of space vertically above the home plate and between the shoulders and knees of a batter in a baseball game.

Other objects of my invention will become apparent from reading the following description taken in connection with the drawings, in which Figure 1 is a diagrammatic showing of an apparatus embodying the principles of my invention;

Figure 1:
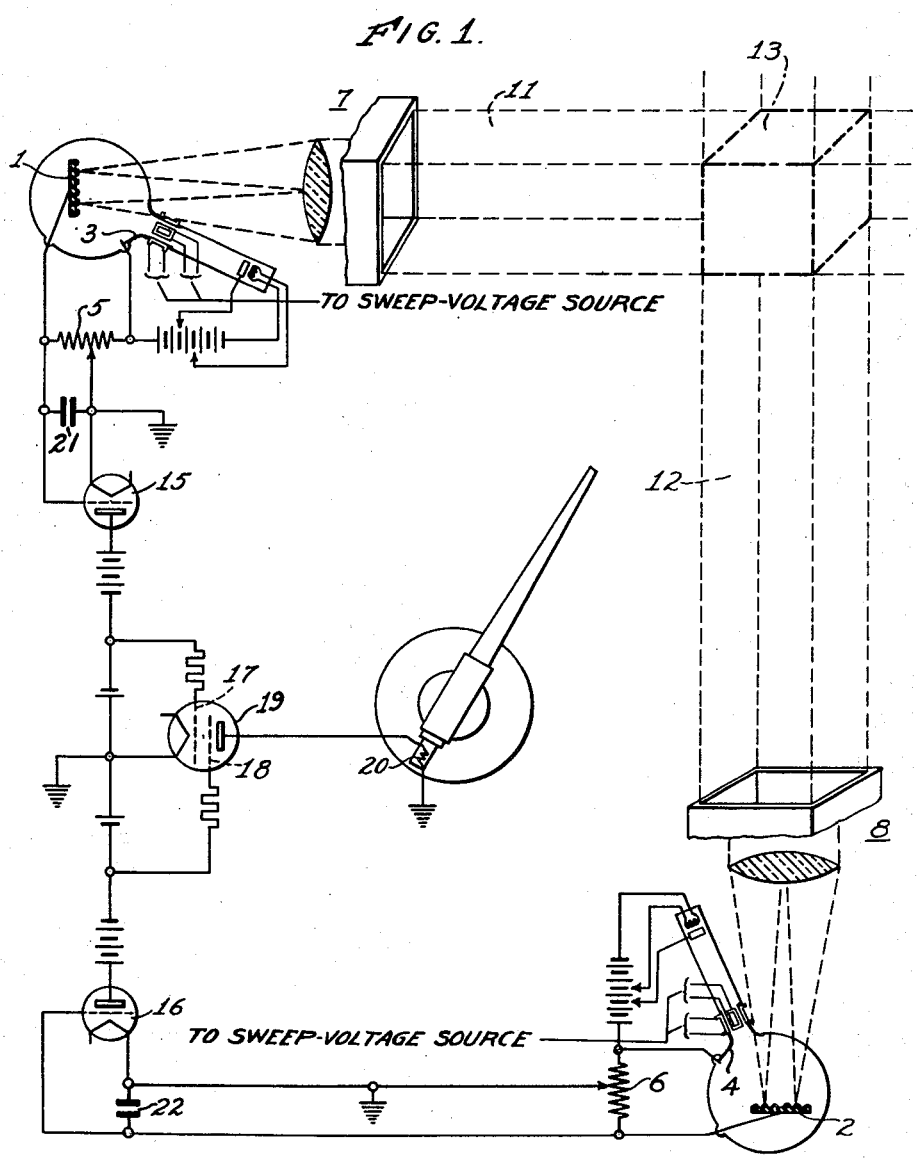

By providing a television pick-up tube, for example, one of the iconoscope type, with a suitable optical system, the latter will focus on the plate of the iconoscope an image of any light emitting or reflecting objects located within the confines of the frustum of a pyramid having the aperture of the optical system as its smaller end, and the pyramid extending outward into space to an indefinite direction therefrom. By properly designing the optical system by methods well known in the optical art, the divergence of the sides of the pyramid may be made extremely small so that it approximates very closely, if not completely, to a cylinder. If any bright object enters the confines of this pyramid, its image will be projected upon the screen of the iconoscope and the electrical output circuit of the latter will be traversed by currents corresponding to the brightness of the object.

If now a second iconoscope, displaced somewhat in position from that just mentioned, is arranged so that its pyramidal field of view shall intersect that of the first-mentioned iconoscope, a certain volume of space will be common to the two fields of view where they intersect, and any bright object which enters this volume of space will produce a response current in the output circuits of both iconoscopes. Briefly stated, I arrange a third circuit controlling a signal, the firing of a gun or other apparatus which it is desired to actuate upon entrance into the above-mentioned volume of space in such a way that it will respond only to the presence of predetermined current variations in the output circuits of both iconoscopes.

It will be noted in this connection that the two iconoscopes may be positioned on the ground and that the volume of space comprising the intersection of the two pyramidal view-fields of the iconoscopes may be located high up in the air at a point distant from either iconoscope. Or from another aspect, it will be noted that one iconoscope may be located in a chamber in the ground directly beneath a transparent home plate on a baseball field so that its field of view constitutes substantially a cylinder having a cross section of the home plate and extending indefinitely upward therefrom; that the second iconoscope may be located at a substantial distance away to one side of the home plate, and having a field of view which extends vertically from the height of the knee of an average batter to the height of his shoulders. The fields of view of these two iconoscopes will intersect exclusively in the volume of space vertically above the home plate and extending from the batter's knees to his shoulders; in other words, the common field of view of the two iconoscopes will constitute exactly the volume of space through which a baseball must be thrown to register a called strike on the batter. By using only such baseballs as are brightly colored, or cleanly white, the amount of light incident upon the screen of each iconoscope will undergo a sudden increase when a pitched baseball passes through the field of view of the iconoscope; and since it is only when such a baseball passes through the volume vertically above the home plate and between the batter's knees and shoulders that both iconoscope output circuits will register an increase of current, a signalling device responsive to the simultaneous increase of current in both iconoscopes can readily be arranged to signal the fact that a pitched ball constitutes a called strike.

The foregoing description of the application of my invention to the game of baseball has been used as a simple mode of illustration of its principles which will be readily familiar to most people, but it is believed that the applicability of the same principles to the detection of the movement of radiant objects in particular space-volumes high in the air, or at other remote locations, will also be evident without much difficulty.

Figure 2:
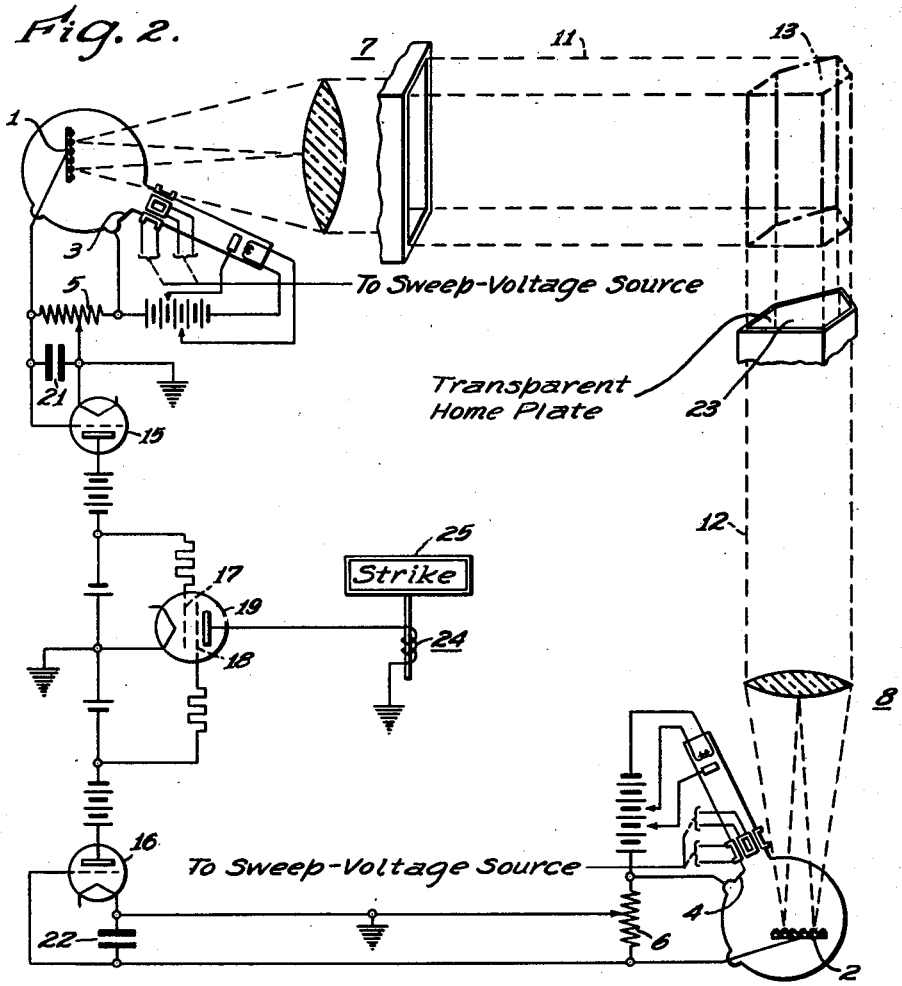
Fig. 2 is a diagrammatic showing of a modified form of my invention.
Figure 3:
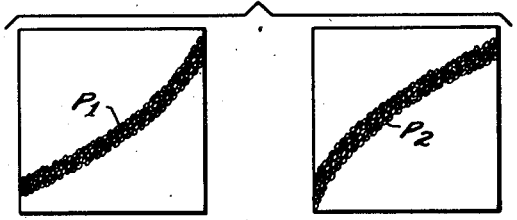
Fig. 3 is a view of a pair of photo-sensitive screens employed in one embodiment of the principles of my invention.

Referring to the drawings, Fig. 1 shows a modification of my invention adapted to controlling gun-fire, Fig. 2 shows a system adapted to indicate strikes at a baseball game, and Fig. 3 is a detail view of a screen used in one modification of my invention. 1 and 2 diagrammatically indicate the photo-sensitive screens or mosaics of a pair of iconoscopes which may be of the type described on pages 265 to 271 of the book "Television," by Zworykin and Morton, published by John Wiley & Sons, New York, 1940. This iconoscope is a photoelectric device and is a modified form of that described in Zworykin United States Patent No. 2,141,059, December 20, 1938, assigned to the assignee of the present application. Each iconoscope consists of a photosensitive mosaic and an electron gun assembled in a highly evacuated glass envelope. The gun is an electron-optical system serving to produce a fine pencil of cathode rays which is made to scan the sensitized side of the mosaic by means of a suitable magnetic, or electrostatic, deflecting system. The mosaic in the normal iconoscope is a very thin mica sheet covered on one side with a vast number of minute silver globules, photosensitized and insulated from one another, and coated on the other with a metal film known as the signal plate. This metal film is coupled, on the one hand, to the silver elements by capacity through the mica and, on the other, to a video amplifier through a signal lead sealed into the bulb.

The optical image is projected onto the silver-coated side of the mosaic. Each silver element, being photo-emissive, accumulates charge by emitting photoelectrons. Thus, information contained in the optical image is stored on the mosaic in the form of a charge image. The scanning beam sweeping across the mosaic in a series of parallel lines releases the charge from each element in turn and brings it to equilibrium, ready to start charging again. The change in charge in each element induces a similar change in charge in the signal plate and, consequently, a current pulse in the signal lead. The train of electrical impulses so generated constitutes the picture signal. For this purpose, the two iconoscopes are respectively provided with collector electrodes 3 and 4 connected through the above-mentioned signal lead and output circuits 5 and 6 with the mosaic screens 1 and 2. It will thus be seen that the scanning means of the iconoscope act to switch the various globules of the mosaic screen successively into circuit with resistors 5 and 6. The two iconoscopes are likewise respectively provided with optical systems diagrammatically represented at 7 and 8 which focus on their mosaic screens the radiation transmitted along delimited volumes of space 11, 12, having their smaller ends located respectively on the apertures of the optical systems 7 and 8. As illustrated in the drawings, the elements of these spacial volumes may be so nearly parallel that they are, in effect, cylindrical space-volumes. The iconoscopes are so positioned that the space-volumes 11, 12 intersect each other and define a volume 13 common to both.

The output circuits of the two iconoscopes may be of conventional type connecting through video amplifiers diagrammatically represented at 15, 16 to impress impulses, respectively, on a pair of control-electrodes 17, 18 of a tetrode 19 having a signalling relay 20 in its output circuit. The tetrode 19 and its output circuit including relay 20 may be considered to be a control means responsive to the combined currents in resistors 5 and 6 to render the relay 20 responsive to the attainment of critical values of current in output resistors 5 and 6.

For best results, the iconoscopes should be so positioned that no object having a very high degree of luminosity is positioned within the confines of their space-pyramids 11 and 12. For example, if it is desired to signal the presence of an airplane within the confines of the common volume 13, the two iconoscopes may be pointed directly upward into the air at night. Alternatively the optical systems may be provided with well-known arrangements to transmit only ultra-violet, infra-red or other special radiation.

In detecting airplanes at night, one or more searchlights would be focused so that their beams traversed the volume 13. There would, of course, be a small or moderate ground current passing through the output circuits 5 and 6 of the iconoscopes, but this would be invariable in amount as long as no sudden increase of brightness on the field of the iconoscope occurred, such as would result from the entrance into the volume 13 of a brightly reflecting object. The scanning of the iconoscopes would be adjusted to synchronize and amplifiers 15 and 16 would be adjusted by means well known in the radio art so that the current in the output circuit of the tube 19 was insufficient to actuate the signal relay 20. If now a brightly reflecting object, such as an airplane, passed through the volume 13, the bright image produced on the mosaic screens 1 and 2 of the iconoscopes would cause increases in the output currents of both the amplifiers 15 and 16, and the tube 19 would have its electrode biases so adjusted that this increase of voltage on the control-electrodes 17 and 18 would cause a sudden large increase in current flowing through the relay 20, thereby causing a signal to be actuated by this relay.

Capacitors 21 and 22, or equivalent means, might shunt the control electrode and cathode of tubes 15, 16 or 19 to store energy so that an increase of output current in an iconoscope at any time during one scanning of the mosaic would cause actuation of relay 20; thus absolute simultaneity of the electric pulses from the iconoscopes would not be necessary to cause response of the relay 20. Thus, if an object passed through the space-volume 11 outside the confines of the space-volume 13, it would cause a charge to be deposited on the capacitor 21 which, by proper proportioning of the resistor 5 to the capacitor 21 in ways well known in the art, would leak away only slowly, thereby applying a bias for a predetermined time to the grid 17 of the tube 19. If, slightly later, the same object passed through the space-volume 12 without entering the space-volume 13, a similar charge would be deposited on the capacitor 22 with a resulting slowly-decreasing bias on the grid 18 of tube 19. The result would be that the tube 19 would become conductive and would activate the relay 20, notwithstanding the fact that the object abovementioned had never passed through the space-volume 13. Fig. 2 likewise shows a transparent home plate 23 to be employed in a baseball game. The optical system 8 focuses on the photo-electric screen of the television pickup tube 2 the light transmitted through a substantially cylindrical volume vertically above the home plate. Similarly, the optical system 7 associated with the pickup tube 1 focuses on the screen of the latter the light flowing through a substantially cylindrical volume having a height equal to the distance from the knees to the shoulder of a batter and the horizontal dimension equal to the distance from front to back of the home plate 23.

Fig. 2 is otherwise similar to Fig. 1, except that the output circuit of the tube 19 contains a relay 24 capable of energizing some conventional form of indicator or sign, such as the illuminated sign 25, whenever an object passes through the above-described volume vertically above the home plate 23 and thereby energizes the amplifier tubes 15 and 16 in a manner believed to be sufficiently clear from the foregoing description of Fig. 1. Thus, when a ball thrown by a pitcher in a baseball game passes over the home plate 23 between the knees and shoulders of a batter, the pickup tubes 1 and 2 will deliver sufficient current to energize the amplifier tubes 15 and 16 and cause the relay 24 to illuminate the sign 25 with the word "Strike."

It will readily be seen that when the above-mentioned apparatus of Fig. 1 is applied to registration of strikes in a baseball game as shown in Fig. 2, the passage of a brightly colored baseball through the volume 13 would have the same effects on the iconoscope screens 1 and 2 and the appurtenant apparatus connecting them with the relay 20 as has just been described for the detection of airplanes, and that, consequently, a device signalling strikes could be caused to register by the relay 20.

Not only may the relay 20 be caused to actuate a signal when an airplane passes through the volume 13, but an anti-aircraft gun may be kept so pointed that its projectiles will traverse the volume 13. The relay 20 may then be used in ways which will be readily apparent to those skilled in the art to actuate the firing pin or other detonating device to cause the discharge of the projectile into the space 13 whenever a reflecting body enters it.

While I have described my arrangement as comprising iconoscopes which are responsive to visible lights, it will readily be evident that other forms of radiation may be employed to actuate the iconoscope, such, for example, as infra red or ultra-violet rays, or even electromagnetic waves short enough to be focused by parabolic reflectors and other optical systems suitable for such electric waves. As an example of such systems, the classical experiments of the scientist Heinrich Hertz before 1900 evolved a number of different arrangements for reflecting and refracting electromagnetic waves in precisely the way that ordinary optical systems reflect and refract visible light rays; and there have been many improvements on Hertz's arrangements for the foregoing purpose. The volume 13 could of course be irradiated from the ground by such non-visible radiations by well-known means.

It is within the purview of my invention that the electrical output current of the iconoscopes shall be governed by only a single small area of the screens 1 and 2, thereby decreasing the size of the spacial cone of the iconoscope which shall register a response to the same fraction of the entire cone of view that the sensitive area of the screen 1 bears to the entire area of the screen. This limitation of sensitivity to only a small area of the screen 1 may be accomplished by connecting the output circuit 5, not to a backing plate covering the entire screen as described in the above-mentioned Zworykin and Morton publication, but to a single limited area of the vacuum plate which is cut off and insulated from the remainder of the vacuum plate. Such an arrangement would constitute, in effect, a single photo-electric cell element. In the case where electromagnetic waves are used, a mosaic comprising a plurality of receiving elements sensitive to the electromagnetic waves may replace the photosensitive element of the conventional iconoscope. Such a plurality of detecting elements may be coupled by methods well known in the radio art so that the amplifiers 15 and 16 are responsive to their combined output currents. In certain instances, a mosaic of radiation-sensitive devices will be unnecessary, and only a single detecting element may be employed. By minimizing the capacitance between the leads connected to the control electrodes and cathodes of amplifiers 15, 16, and 17, response of the relay 20 would occur only when the luminous image occupied a certain limited area of each iconoscope screen, i. e., when it occupied an area on which the iconoscope scanning beams were simultaneously incident. By dephasing the scanning beam of one iconoscope from exact synchronism with the beam of the other location of these areas, and correspondingly the location of the object in the space-volume 13, which would cause actuation of relay 20, could be varied.

The shape of the volume of space in which the presence of a radiant object will result in actuation of the relay 20 is not limited to that of a cylinder or the intersection of two pyramids, but may be made to conform to any desired configuration in a way which will now be explained. For example, it may be made to conform to the trajectory of a projectile from a gun; that is to say, it would be a volume having what might be described as the form of a cylinder with a curved axis, the curve of the axis corresponding with the path through space which would be traversed by the central point of a projectile. The latter curve is at least a rough approximation to a parabola. It will be noted that if any such volume as has just been described could be photographed upon a pair of photographic screens positioned in the places occupied by the mosaics 1 and 2 in Fig. 1, paths of two different shapes would appear in the photographs; that is to say, the curved-axis cylinder carved out in space by the passage of a shell would appear on one photograph as a narrow curved strip or line of substantially constant width and of one configuration, and on the other photograph as a narrow curved strip or line of substantially constant width but of a slightly different configuration. The shape of these two curved lines on the two screens is sufficient to completely determine the path in space of the shell trajectory. Fig. 3 shows a pair of screens 1 and 2 with paths $P_1$, $P_2$ comprising linear strips such as have just been described.

By arranging the cathode-ray deflecting system of an iconoscope to be supplied with currents of the right wave form, the trace of the cathode-ray beam on the iconoscope can be made to traverse any selected curved line thereon. It would, accordingly, be possible, by supplying electric current of proper wave form (which would, in general, be different from the sawtooth waves now used with conventional iconoscope deflecting coils) to cause the cathode ray in the first iconoscope to repeatedly traverse the exact curve on the mosaic 1 which would correspond to the image thereon of the trajectory of the projectile from the gun controlled by the relay 20. Similarly, by supplying currents of exactly the proper wave form to the second iconoscope, the cathode ray thereon could be caused to follow exactly the curve corresponding to the image on the mosaic of that iconoscope of the trajectory of the aforesaid gun. It would further be possible to so synchronize and time the respective electrical waves supplied to the deflection systems of the first and second iconoscopes that the cathode ray of the second iconoscope should be incident at every instant upon the same point in the projectile path as was the cathode-ray beam of the first iconoscope at that same instant. In other words, the cathode rays in the two iconoscopes would traverse the paths on their respective mosaics in complete synchronism with each other.

Now if a luminous object were present within the volume of space which constituted the path of the projectile from the above-mentioned gun for a time at least equal to the period of one traverse of the above-mentioned paths by the cathode-ray beam, the cathode-ray beams would sensitize and cause a discharge through the output circuits of the respective iconoscopes at that particular instant when the cathode rays were simultaneously incident in the respective iconoscopes upon the image of the luminous object. On the other hand, if the luminous object were anywhere within the field of view of either or both the iconoscopes other than in the above-mentioned trajectory, the luminous spot which would appear on one or both of the iconoscope screens would not be struck simultaneously by the two cathode rays and the two output circuits of the iconoscopes would not be simultaneously energized. Since the two control electrodes 17 and 18 of the tube 19 could be arranged to render the tube 19 conductive to cause current flow through the relay 20 only when the control-electrodes 17 and 18 were energized simultaneously by the output of the two respective iconoscopes, the relay 20 would be actuated only when the cathode-ray beams of the two iconoscopes were simultaneously incident upon the luminous images of the object. In other words, the relay 20 would be energized to produce a signal or to discharge the gun only at such time as the luminous object was present somewhere within the confines of the trajectory which would be carved out by the projectile fired by the gun.

The shape of the curves on the two iconoscope screens could be determined by calculation if not by photography; and the wave forms of the current needed for the respective electron-beam deflecting coils of the iconoscopes could likewise be determined readily by calculation once the shape of these curves had been determined. Any such curve may be analyzed by Fourier series into its constituent harmonic currents; currents of the frequency, amplitude and phase of such harmonics could be generated by electron-tube oscillators of conventional type, and the required waves for the deflecting coils thus be synthetized from the constituents thus produced.

Since in the arrangement now under discussion the only portions of the mosaic screen actually traversed by the electron-beam are those lying along the curves described above as constituting the images of the shell-trajectory, and these are merely linear in form, it would be possible to dispense with, or inactivate all photo-sensitive elements of the mosaic except those forming these lines; in short, a mosaic comprising a mere line of photo-sensitive elements on which the image of the radiant object would be projected if it entered the shell-trajectory, would be useful under many conditions.

While I have described a specific application of the principles of my invention, this is only for the purpose of illustration and they will be recognized by those skilled in the art as of broader application.

I claim as my invention:

1. In a device for signalling called strikes in baseball games, a transparent home plate, a photo-electric device located beneath said transparent home plate and provided with an optical system for focusing on its screen only such light as traverses a cylindrical volume vertically above said home plate, a second photo-electric device provided with an optical system which focuses on its screen only light passing over said home plate between the height of the order of fifteen inches and the height of the order of sixty inches above said plate, and means responsive to a simultaneous increase in illumination on the screens of said two tubes to actuate a signal indicating a called strike.

2. In an object-detecting system a pair of image-responsive devices each having a radiation-responsive member subdivided into a plurality of sections, current responsive means, and means for controlling said means by electrical responses generated at different times in some of said sections located in the separate devices.

3. In an object-detecting system a pair of image detecting devices each having a radiation-responsive area subdivided into a plurality of separate subdivisions, means for focusing radiation from a predetermined volume of space on both said image pick up devices, a work circuit, and means for controlling said work circuit in response to energization at different times of predetermined ones of said subdivisions located in different image responsive devices.

4. In combination, a first optical system adapted to focus radiation projected from a path through space on one strip of radiation-sensitive surface positioned in one region, a second optical system adapted to focus radiation projected from the same path on a second and differently-shaped strip of radiation-sensitive surface located in a second region, a circuit for each said strip, means for the simultaneous scanning of each said strip with an agency adapted to cause current flow in its associated circuit which shall vary in time proportional to the excitation of the successive elements of length of each said strip, and means responsive to the simultaneous attainment of a critical value by both said currents to activate an output circuit.

5. In combination, a first optical system adapted to focus radiation projected from a volume of space on one pattern of radiation-sensitive surface positioned in one region, a second optical system adapted to focus radiation projected from said volume on a second and differently-shaped pattern of radiation-sensitive surface located in a second region, a circuit for each said pattern, means for the simultaneous scanning of each said pattern with an agency adapted to cause current flow in said circuit which shall vary in time with the excitation of the successive elements of area of said pattern, and means responsive to the simultaneous attainment of a critical value by both said currents to activate an output circuit.

FREDERICK W. LYLE.

REFERENCES CITED

The following references are of record in the file of this patent:

UNITED STATES PATENTS

| Number | Name | Date |
|---|---|---|
| 678,757 | Obry | July 16, 1901 |
| 752,460 | Mautner | Feb. 16, 1904 |
| 1,747,664 | Droitcour | Feb. 18, 1930 |
| 2,099,764 | Touceda | Nov. 23, 1937 |
| 2,113,899 | Oram | Apr. 12, 1938 |
| 2,116,717 | Scharlau | May 10, 1938 |
| 2,133,241 | Baker | Oct. 11, 1938 |
| 2,141,059 | Zworykin | Dec. 20, 1938 |
| 2,177,803 | Ferte et al. | Oct. 31, 1939 |
| 2,179,243 | Ives | Nov. 7, 1939 |
| 2,226,436 | Lippincott | Dec. 24, 1940 |
| 2,262,942 | Jones | Nov. 18, 1941 |
| 2,287,415 | Burnett | June 23, 1942 |

FOREIGN PATENTS

| Number | Country | Date |
|---|---|---|
| 681,961 | France | Feb. 10, 1930 |
| 764,537 | France | Mar. 5, 1934 |